(12) United States Patent
Wang et al.

(10) Patent No.: US 11,900,269 B2
(45) Date of Patent: Feb. 13, 2024

(54) METHOD AND APPARATUS FOR MANAGING KNOWLEDGE BASE, DEVICE AND MEDIUM

(71) Applicant: Beijing Baidu Netcom Science And Technology Co., LTD., Beijing (CN)

(72) Inventors: Weiyu Wang, Beijing (CN); Chao Lu, Beijing (CN); Yong Zhu, Beijing (CN)

(73) Assignee: Beijing Baidu Netcom Science and Technology Co., Ltd., Beijing (CN)

( * ) Notice: Subject to any disclaimer, the term of this patent is extended or adjusted under 35 U.S.C. 154(b) by 766 days.

(21) Appl. No.: 16/677,464

(22) Filed: Nov. 7, 2019

(65) Prior Publication Data

US 2020/0257989 A1 Aug. 13, 2020

(30) Foreign Application Priority Data

Feb. 11, 2019 (CN) .......................... 201910110442.4

(51) Int. Cl.
*G06N 5/025* (2023.01)
*G06F 16/26* (2019.01)
*G06F 16/28* (2019.01)

(52) U.S. Cl.
CPC ............. *G06N 5/025* (2013.01); *G06F 16/26* (2019.01); *G06F 16/288* (2019.01)

(58) Field of Classification Search
CPC ........ G06F 16/26; G06F 16/288; G06N 5/025
See application file for complete search history.

(56) References Cited

U.S. PATENT DOCUMENTS

| | | | | |
|---|---|---|---|---|
| 5,197,116 A | * | 3/1993 | Katoh | G06N 5/025 706/919 |
| 6,535,864 B1 | * | 3/2003 | Zahn | G06N 5/04 706/45 |
| 7,685,252 B1 | * | 3/2010 | Maes | G06F 9/451 715/236 |
| 7,698,713 B2 | * | 4/2010 | Erlingsson | G06F 9/4486 709/224 |

(Continued)

FOREIGN PATENT DOCUMENTS

| | | |
|---|---|---|
| CN | 101075976 A | 11/2007 |
| CN | 103019650 A | 4/2013 |

(Continued)

OTHER PUBLICATIONS

Korean Office Action dated Jun. 28, 2021 in KR Application No. 10-2019-0157614.

(Continued)

*Primary Examiner* — Mark E Hershley
(74) *Attorney, Agent, or Firm* — Weaver Austin Villeneuve & Sampson LLP

(57) ABSTRACT

Exemplary embodiments of the present disclosure provide a method and apparatus for managing a knowledge base, a device and a computer readable storage medium. The method for managing a knowledge base includes: forking, in response to receiving a request for modification of a rule for a first namespace, the rule to the first namespace, the rule being used to constrain structured data in a knowledge base; modifying, based on the request for modification of the rule, the rule in the first namespace; and adding the modified rule to a rule base associated with the knowledge base.

17 Claims, 4 Drawing Sheets

(56) References Cited

U.S. PATENT DOCUMENTS

| | | | | |
|---|---|---|---|---|
| 7,925,605 | B1* | 4/2011 | Rubin | G06N 5/025 |
| | | | | 706/47 |
| 8,073,802 | B2* | 12/2011 | Trefler | G06N 5/025 |
| | | | | 706/62 |
| 8,473,519 | B1* | 6/2013 | Siddiqui | G06F 16/00 |
| | | | | 707/791 |
| 8,555,238 | B2* | 10/2013 | White | G06F 8/30 |
| | | | | 717/124 |
| 9,118,697 | B1* | 8/2015 | Kishore | G06F 16/1827 |
| 10,255,552 | B2* | 4/2019 | Soon-Shiong | G06T 9/00 |
| 10,326,672 | B2* | 6/2019 | Scheib | H04L 41/0806 |
| 10,831,380 | B2* | 11/2020 | Isherwood | G06F 3/0619 |
| 2004/0024724 | A1* | 2/2004 | Rubin | G06N 5/025 |
| | | | | 706/46 |
| 2004/0139106 | A1* | 7/2004 | Bachman | G06F 16/951 |
| 2005/0091346 | A1* | 4/2005 | Krishnaswami | H04L 41/0894 |
| | | | | 719/310 |
| 2006/0020566 | A1* | 1/2006 | Wu | G06Q 10/10 |
| | | | | 706/50 |
| 2007/0136335 | A1* | 6/2007 | Dionne | G06F 16/367 |
| 2008/0147584 | A1* | 6/2008 | Buss | G06N 5/025 |
| | | | | 706/47 |
| 2008/0301175 | A1* | 12/2008 | Applebaum | G06F 16/24565 |
| | | | | 707/999.102 |
| 2009/0089237 | A1* | 4/2009 | Hebbar | G06N 5/025 |
| | | | | 706/50 |
| 2009/0193053 | A1* | 7/2009 | Swart | G06F 16/84 |
| 2009/0228257 | A1* | 9/2009 | Thunemann | G06F 30/00 |
| | | | | 703/8 |
| 2009/0299949 | A1* | 12/2009 | Tan | G06N 5/025 |
| | | | | 706/59 |
| 2011/0126275 | A1* | 5/2011 | Anderson | G06F 9/455 |
| | | | | 726/8 |
| 2011/0225293 | A1* | 9/2011 | Rathod | H04W 4/60 |
| | | | | 709/224 |
| 2012/0166406 | A1* | 6/2012 | Byrne | G06F 16/2365 |
| | | | | 707/694 |
| 2015/0278701 | A1* | 10/2015 | Danielsson | G06F 8/313 |
| | | | | 706/47 |
| 2017/0177744 | A1 | 6/2017 | Potiagalov et al. | |
| 2018/0181769 | A1* | 6/2018 | Vora | H04L 63/105 |
| 2018/0197086 | A1* | 7/2018 | Schroeder | G06N 5/025 |
| 2020/0167668 | A1* | 5/2020 | Chen | G06N 5/025 |
| 2020/0257989 | A1* | 8/2020 | Wang | G06N 5/025 |
| 2021/0037086 | A1* | 2/2021 | Wu | H04L 67/10 |

FOREIGN PATENT DOCUMENTS

| | | |
|---|---|---|
| CN | 103383683 A | 11/2013 |
| CN | 108447536 A | 8/2018 |
| CN | 108984683 A | 12/2018 |
| JP | H04-112330 | 4/1992 |
| JP | 2000242499 A | 9/2000 |
| JP | 2003044281 A | 2/2003 |
| JP | 2005174116 A | 6/2005 |
| JP | 2016509301 A | 3/2016 |
| JP | 2017527016 A | 9/2017 |
| KR | 20170024998 A | 3/2017 |
| KR | 101757849 B1 | 7/2017 |

OTHER PUBLICATIONS

Zhang et al., "Study on semantic-based personalized clinical pathways," http://d.wanfangdata.com.cn/thesis/Y2808013, 2015, 86 pages.
Japanese Notice of Allowance dated May 24, 2022 issued in JP Application No. 2019-211254, no English translation.

* cited by examiner

METHOD AND APPARATUS FOR MANAGING KNOWLEDGE BASE, DEVICE AND MEDIUM

INCORPORATION BY REFERENCE

An Application Data Sheet is filed concurrently with this specification as part of the present application. Each application that the present application claims benefit of or priority to as identified in the concurrently filed Application Data Sheet is incorporated by reference herein in its entirety and for all purposes.

TECHNICAL FIELD

Embodiments of the present disclosure mainly relate to the field of information processing, and more specifically to a method and apparatus for managing a knowledge base, a device and a medium.

BACKGROUND

A knowledge base consists of a large amount of structured data. The structured data needs to follow certain representation norm, so that the data can be read and understood by a machine. The representation norm used to constrain the structured data is referred to as a rule or schema.

Generally, in the presence of a large number of knowledge base instances (such as general knowledge bases, industry knowledge bases related to various professional fields, and application knowledge bases related to various products), repeated fields of knowledge are described among different knowledge bases. For example, a video base and a star base both include data of entertainment stars, so the rules defined for these knowledge bases also have great similarities. However, conventional technologies cannot define rules for a large number of knowledge bases at low cost.

SUMMARY

According to exemplary embodiments of the present disclosure, a scheme for managing a knowledge base is provided.

In a first aspect, an embodiment of the present disclosure provides a method for managing a knowledge base, including: forking, in response to receiving a request for modification of a rule for a first namespace, the rule to the first namespace, the rule being used to constrain structured data in the knowledge base; modifying, based on the request for modification of the rule, the rule in the first namespace; and adding the modified rule to a rule base associated with the knowledge base.

In a second aspect, an embodiment of the present disclosure provides an apparatus for managing a knowledge base, including: a forking module configured to fork, in response to receiving a request for modification of a rule for a first namespace, the rule to the first namespace, the rule being used to constrain structured data in the knowledge base; a modification module configured to modify, based on the request for modification of the rule, the rule in the first namespace; and an addition module configured to add the modified rule to a rule base associated with the knowledge base.

In a third aspect, an embodiment of the present disclosure provides an electronic device, including one or more processors; and a storage apparatus for store one or more programs, where the one or more programs, when executed by the one or more processors, cause the one or more processors to implement the method described in the first aspect of the present disclosure.

In a fourth aspect, an embodiment of the present disclosure provides a computer readable medium storing a computer program, where the program, when executed by a processor, implements the method according to the first aspect of the present disclosure.

It should be appreciated that the description of the summary is not intended to limit the key or important features of the embodiments of the present disclosure, or to limit the scope of the present disclosure. Other features of the present disclosure will become readily comprehensible through the following description.

BRIEF DESCRIPTION OF THE DRAWINGS

The above and other features, advantages and aspects of various embodiments of the present disclosure will become more apparent with reference to the accompanying drawings and detailed descriptions below. The same or similar reference signs in the drawings denote the same or similar elements.

DETAILED DESCRIPTION OF EMBODIMENTS

Figure 1:
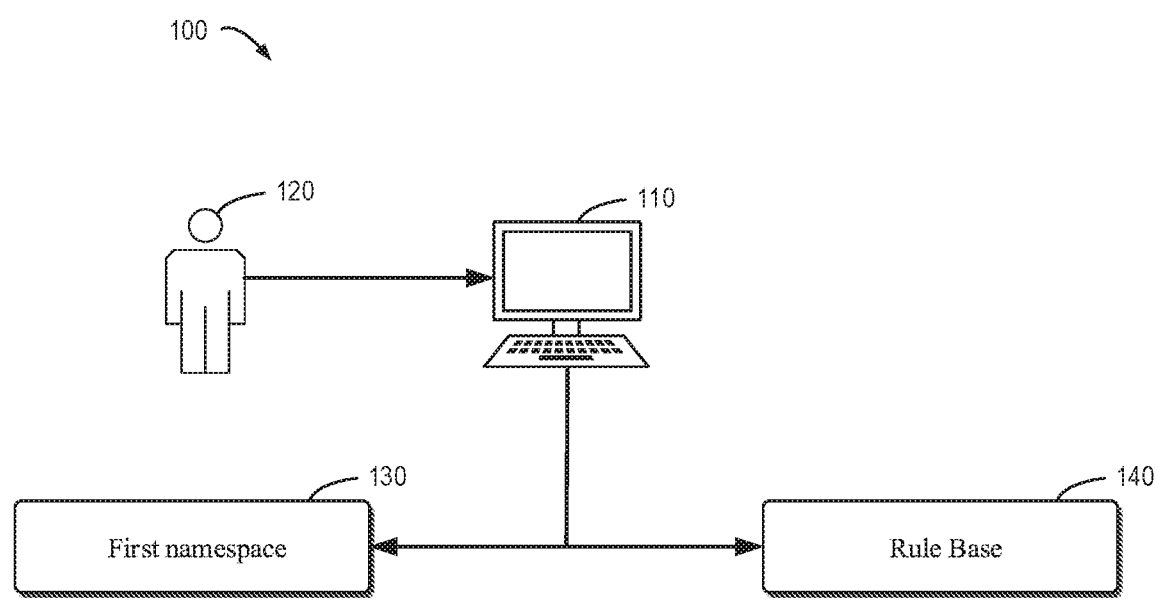
FIG. 1 shows a schematic diagram of an example environment in which embodiments of the present disclosure may be implemented.

The embodiments of the present disclosure will be described in more detail below with reference to the accompanying drawings. Although some embodiments of the present disclosure are shown in the drawings, it should be appreciated that the present disclosure may be implemented in various forms and should not be construed as limited to the embodiments described here, and these embodiments are provided in turn for more thorough and complete understanding of the present disclosure. It should be understood that the drawings and embodiments of the present disclosure are merely illustrative, but are not intended to limit the scope of the present disclosure.

In the description of the embodiments of the present disclosure, the term "include" and the like should be interpreted as open inclusion, i.e., "include but not limited to". The term "based on" should be interpreted as "at least partially based on". The term "an embodiment" or "the embodiment" should be interpreted as "at least one embodiment." The terms "first", "second" and the like may indicate different or identical objects. Other explicit and implicit definitions may also be included below.

The term "knowledge base" indicates a graph-based data structure consisting of nodes and edges, such as a knowledge map or other suitable database. In the knowledge base, each node represents an "entity" that exists in the real world, and each edge represents a "relationship" between the entities. The knowledge base is an effective representation of relationships. In other words, the knowledge base links different kinds of information to obtain a relationship network, thus providing the ability to analyze problems from a perspective of "relationships". The term "rule" indicates a representation norm used to constrain structured data in the knowledge base. The term "namespace" indicates a form of code organization. Codes are organized and reused through the namespace to distinguish different code functions.

As described above, conventional technologies cannot define rules for a large number of knowledge bases at low cost. Conventionally, there are two schemes for solving rule definitions across knowledge bases. In the first scheme, all parties of the knowledge bases are solely responsible for building their own rules. In the presence of knowledge bases with overlapping data, the built rule system is shared off line.

Although the independent definition of rules have the advantages of high efficiency and isolation, when a large number of rules exist, the management cost of the rule system, the use of data, and the reuse cost are significantly improved. For example, for semantically identical classes/attributes, symbols defined by different parties may be different. Conversely, the same symbol may be endowed with completely different meanings by different parties. In addition, since the replication between different rule systems is not traceable, after a period of upgrade, the original consistent symbols become inconsistent. The above problems result in massive rule mappings and are very prone to errors at the time of knowledge linkage and calculation across knowledge bases.

In the second scheme, by defining a unified rule system, all knowledge bases are restrained by the rule system. Although the consistency of knowledge representation may be solved by maintaining the unified rule system, more other problems are inevitably caused. For example, the definition and combination costs of the rule system are very high, and the requirements for profession and time of the rule definition party are also very high, so that the unified rule system has a long update cycle, which is not conducive to rapid iterative products. In addition, different application scenarios have different dependence on the representation of a knowledge base. Even for the same knowledge, the knowledge representation norms required by different applications may be completely different. The unified rule system cannot solve these problems. A solution for managing a knowledge map is proposed hereby.

Generally, according to the embodiments of the present disclosure, in a case where customization of a rule is required in a namespace, the rule may be forked to the namespace from a rule base containing uniformly defined rules or from another namespace, and the rule forked to the namespace is modified to meet the customization requirements of different knowledge bases. Further, the modified rule may be added/combined to the rule base to extend the rule base. Therefore, this scheme has good reusability and traceability while flexibly adapting to the requirements of different knowledge bases.

FIG. 1 shows a schematic diagram of an example environment 100 in which the embodiments of the present disclosure may be implemented. As shown in FIG. 1, the environment 100 includes a computing device 110, a user 120 (also referred to as a "first user"), a namespace 130 (also referred to as a "first namespace") for the first user, and a rule base 140. For example, the computing device 110 may be any device having computing power, such as a distributed computing device, a mainframe, a server, a personal computer, a tablet computer, or a smart phone.

As mentioned above, a knowledge base consists of a large amount of structured data. The structured data needs to follow certain representation norm, and the representation norm used to constrain the structured data is referred to as a rule. In some embodiments, the structured data may be represented as a triple. The following is a specific example of structured data and a rule.

First structured data: (Andy Lau, wife, Zhu Liqian);
Second structured date: (Andy Lau, isA, Person);
Third structured data: (Zhu Liqian, isA, Person);
Rule: (Person, wife, Person).

The first structured data, the second structured data, and the third structured data represented by the triplet represent objective facts or entities, and the rule is a knowledge constraint based on the objective facts or entity abstractions. The rule may be used to verify the validity of the first structured data, the second structured data, and the third structured data, or to guide the production of similar knowledge. The rule may contain a relationship between the entities. For example, the rule "(Person, wife, Person)" may contain a relationship "wife" (called an attribute) between the entities "Person" (called a class).

The rule base 140 may contain a uniformly defined rule. In some embodiments, when anew knowledge base is created, the first user 120 may request the computing device 110 to directly multiplex the uniformly defined rule in the rule base 140, such as the rule "(Person, wife, Person)". However, in some embodiments, the uniformly defined rule cannot meet the needs of a specific knowledge base. For example, the first user 120 may desire to use a more specific rule "(Male, wife, Female)".

Thus, when a customization requirement for the knowledge base arises, the first user 120 may request the computing device 110 to modify the uniformly defined rule. The computing device 110 may fork the requested rule to the first namespace 130 and modify the forked rule. For example, the computing device 110 may fork the rule "(Person, wife, Person)" to the first namespace 130 from the rule base 140 or from a namespace ("second namespace") for another user ("second user"), and modify the rule into a rule "(Male, wife, Female)".

In some embodiments, the modified rule may also be added to the rule base 140 to extend the rule base 140. For example, the first user 120 may request the computing device 110 to add the modified rule to the rule base 140. In this case, a verifier verifies the rule to be added, and adds the rule satisfying a predetermined criterion to the rule base 140.

For example, the verifier may determine that the rule "(Male, wife, Female)" satisfies a predetermined criterion about expression of rules, and accordingly allows adding the rule "(Male, wife, Female)" to the rule base 140 to extend the rule base 140.

Conversely, the verifier may determine that the rule "(Nanren, wife, Nvren)" does not satisfy the predetermined criterion about expression of rules (for example, a Chinese Pinyin expression rule is not allowed), and accordingly does not allow adding the rule "(Nanren, wife, Nvren)" to the rule base 140. It should be understood that although the expression of rules is used as an example of the predetermined criterion, any appropriate limitation about the rules may be used as a predetermined criterion. In addition, although the verifier may verify the rule as described above, any appropriate entity may verify the rule, including, but not limited to, the first user 120 itself and a user (e.g., the second user) who is going to use the rule base and is associated with other namespace, etc.

Moreover, in some embodiments, the computing device 110 records the operations of modifying the rule for the first namespace 130 and adding the modified rule, thereby supporting the tracking and synchronization of the rule.

Thus, the requirement for extending the rule base containing standard rules is met, and custom rules may be quickly created to support rapid iteration of the knowledge base. In addition, through a standard development mechanism, the dependencies between different versions of rules (such as original rules and modified rules) are retained. Moreover, the operation of adding the rule is recorded, thereby supporting the traceability and synchronization of the rule.

Figure 2:
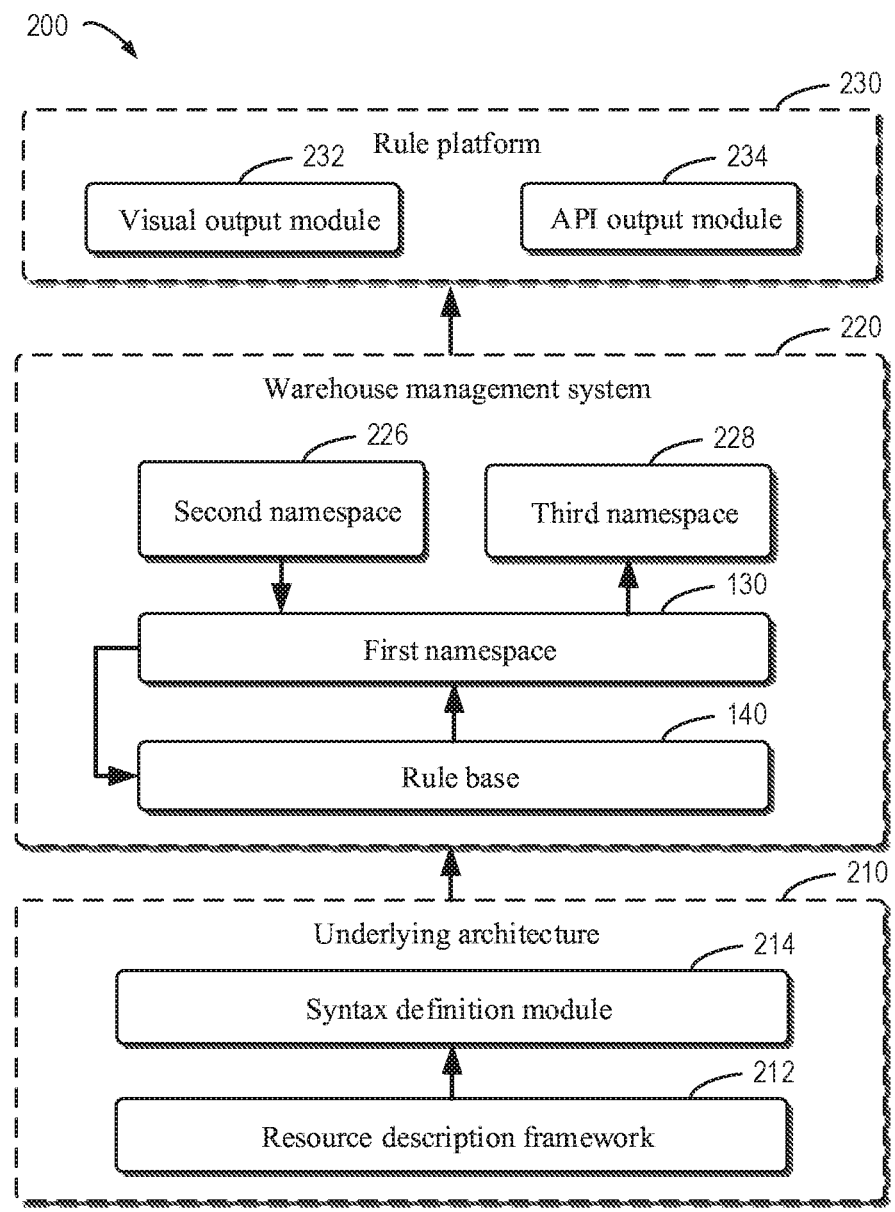
FIG. 2 shows a schematic diagram of another example environment in which embodiments of the present disclosure may be implemented.

FIG. 2 shows a schematic diagram of another example environment 200 in which the embodiments of the present disclosure may be implemented. The environment 200 is a specific implementation of the environment 100 in FIG. 1. It should be understood that the environment 100 may also be implemented in any other suitable form. The environment 200 includes an underlying architecture 210, a warehouse management system 220, and a rule platform 230.

The underlying architecture 210 includes a resource description framework 212 and a syntax definition module 214. The resource module framework 212 is a markup language for describing Web resources. The resource module framework 212 is used to process metadata of resources, and to describe the metadata as a data model by using a "subject-predicate-object" structure (or triplet) of "resource-attribute-attribute value". For example, the resource module framework 212 may be a W3C RDF/RDFS (World Wide Web Consortium, Resource Description Framework/Resource Description Framework Schema.

The syntax definition module 214 may encapsulate the resource description framework 212, so that the user does not need to know the norm of the resource description framework 212, and the syntax definition module 214 may provide a norm for defining rules to support the description of the rules. In some embodiments, the syntax definition module 214 may support the uniformly defined rule in the rule base 140, and modify the rule.

The rule base 140 and namespaces (such as the first namespace 130, a second namespace 226, and a third namespace 228) may be hosted in the warehouse management system 220. In some embodiments, the warehouse management system 220 may control a version, for example, record the operations of modifying a rule and adding the modified rule, thereby supporting the tracking and synchronization of the rule. For example, the warehouse management system 220 may be a GitLab.

As described above, when a new knowledge base is created, the first user 120 may request the computing device 110 to directly multiplex the uniformly defined rule in the rule base 140. Alternatively, the first user 120 may also request the computing device 110 to multiplex a rule in the second namespace 226.

When the uniformly defined rule or the rule forked from other namespace fails to meet the needs of a specific knowledge base, the first user 120 may request the computing device 110 to modify the rule. The computing device 110 may fork the requested rule to the first namespace 130 and modify the forked rule. For example, the computing device 110 may fork the rule "(Person, wife, Person)" to the first namespace 130, and modify the rule into a rule "(Male, wife, Female)".

Moreover, when a user (also referred to as "third user") associated with the third namespace 228 requests to use a rule in the first namespace 130, the rule (for example, the modified rule) in the first namespace 130 may also be forked into the third namespace 228 for use or modification. Further, when the first user 120 requests to add the modified rule to the rule base 140, the modified rule approved by the verifier may also be added to the rule base 140 to extend the rule base 140.

The rule platform 230 includes a visual output module 232 and an Application Programming Interface (API) output module 234. In some embodiments, after a rule in the namespace is registered to the rule platform 230, the rule may be output to the user by the visual output module 232 through a visual page, or output by the API output module 234 in response to a call to the rule.

Since the rules are modified based on the initial rules, the semantically identical classes/attributes are continuously used to a large extent. In addition, since the forking relationship of the rules is maintained by the warehouse management system 220, upstream synchronization and downstream update by requested addition of rules are promoted, and the consistency of the rules is achieved. Moreover, the update of the rule base 140 no longer relies on the efficiency of a rule definition party, and the cycle of maintaining the rule base 140 is prolonged. Further, differentiation may be maintained between the rules in the rule base 140 and the rules in the namespace.

Figure 3:
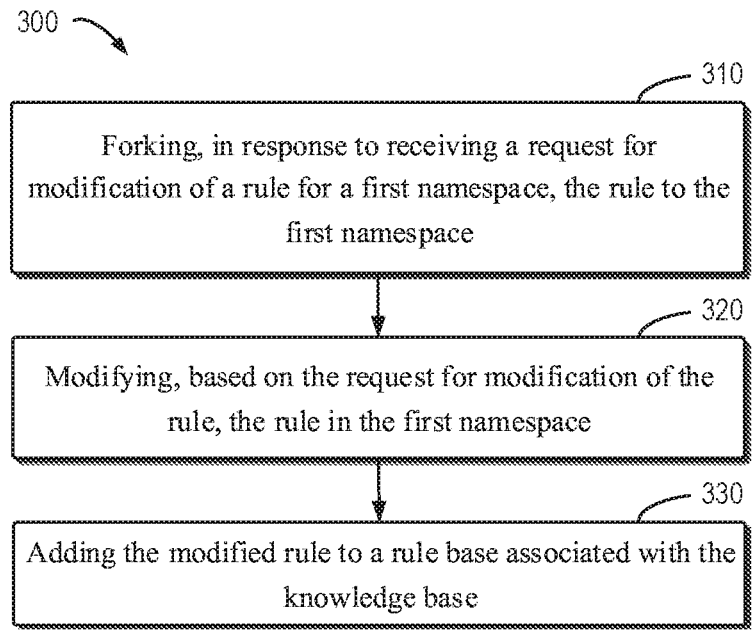
FIG. 3 shows a flowchart for managing a knowledge base according to an embodiment of the present disclosure.

FIG. 3 shows a flowchart of an example of a method 300 for managing a knowledge base according to an embodiment of the present disclosure. For example, the method 300 may be executed by the computing device 110 shown in FIG. 1 or other suitable device. The method 300 may also include additional steps not shown and/or the steps shown may be omitted, and the scope of the present disclosure is not limited thereto.

In step 310, a computing device 110 forks, in response to receiving a request for modification of a rule for a first namespace 130, the rule to the first namespace 130. The rule is used to constrain structured data in a knowledge base. In some embodiments, the computing device 110 may fork the rule from a rule base 140 to the first namespace 130. Alternatively, the computing device 110 may fork the rule from a second namespace 226 to the first namespace 130. The first namespace 130 is different from the second namespace 226. In this way, the scheme may use not only the rule in the rule base 140, but also the rule in other namespace.

For example, when a first user 120 desires to customize a rule of a knowledge base associated with the first namespace 130, for example, when the first user 120 may desire to customize a standard rule "(Person, wife, Person)" in the rule base 140, the first user 120 may request the computing device 110 to modify the rule. The computing device 110 may fork the requested rule to the first namespace 130. For example, the computing device 110 may fork the rule "(Person, wife, Person)" to the first namespace 130.

In step 320, the computing device 110 modifies the rule in the first namespace based on the request for modification of the rule for the first namespace 130. In some embodiments, the computing device 110 may determine a rule modification mode for modifying the rule from the request for modification of the rule. The computing device 110 may modify one or more entities contained in the rule based on the determined rule modification mode. Additionally or alternatively, the computing device 110 may modify the relationship between these entities. In this way, the scheme may make any appropriate modification to the rule based on an actual user requirement for a specific namespace.

For example, the computing device 110 may determine the rule modification mode that the entity "Person" in the rule is modified into "Male" and the entity "Person" is modified into "Female", and accordingly modifies the rule "(Person, wife, Person)" into a rule "(Male, wife, Female)".

In step 330, the computing device 110 adds the modified rule from the first namespace 130 to a rule base 140 associated with a knowledge base. In some embodiments, the first user 120 may request to add the modified rule to the rule base 140, and the computing device 110 may add the modified rule to the rule base 140 in response to this request. Thus, the rule base 140 is extended by the modified rule, and the possibility that rules in the rule base 140 meet actual user needs for a specific namespace is improved.

Additionally or alternatively, in some embodiments, the operation of adding the rule to the rule base requires verification of a verifier. In this case, the computing device 110 may send to the verifier a request for adding the modified rule to the rule base 140. If the verifier allows adding the modified rule to the rule base 140, the computing device 110 adds the modified rule to the rule base 140.

For example, the computing device 110 sends to the verifier, according to the received request for adding the modified rule from the first namespace 130 to the rule base 140, a request for adding the modified rule to the rule base 140. After receiving the request, the verifier verifies whether the modified rule meets a predetermined criterion.

For example, the predetermined criterion may be an expression of rules, for example, classes and attributes are only allowed to be expressed in English. In this case, the verifier may determine that the rule "(Male, wife, Female)" conforms to the expression of rules, and allow adding the rule to the rule base 140. In addition, the verifier may determine that the rule "(Nanren, wife, Nvren)" does not conform to the expression of rules, and refuse adding the rule to the rule base 140. Then, the verifier sends to the computing device 110 a response of whether the verification succeeds. When the computing device 110 receives from the verifier a response indicating that the verification succeeds, the computing device 110 adds the rule to the rule base 140. By increasing the verification link of the verifier, the reliability and validity of extending the rule base are further standardized.

Optionally, the computing device 110 provides, in response to receiving a request for use of the modified rule by a third namespace 228, the modified rule to the third namespace. The third namespace is different from the first namespace. For example, when a third user requests to use a rule in the first namespace 130, the rule (e.g., the rule "(Male, wife, Female)") in the first namespace 130 may also be forked to the third namespace 228 for use or modification. Thus, the flexibility and adaptability of the system in this scheme are improved by allowing directly providing the modified rule to other namespace.

In some embodiments, the computing device 110 may output a rule in a namespace. For example, the computing device 110 may output a rule to a user through a visual page, and may also output a rule in response to a call to the rule. In this way, the scheme may present a rule to a user and provide a rule to a machine appropriately.

Thus, the semantically identical class/attribute may be continuously used to realize the consistency of rules, prolong the cycle of maintaining the rule base 140, and maintain the differentiation between the rules in the rule base 140 and the rules in the namespace.

Figure 4:
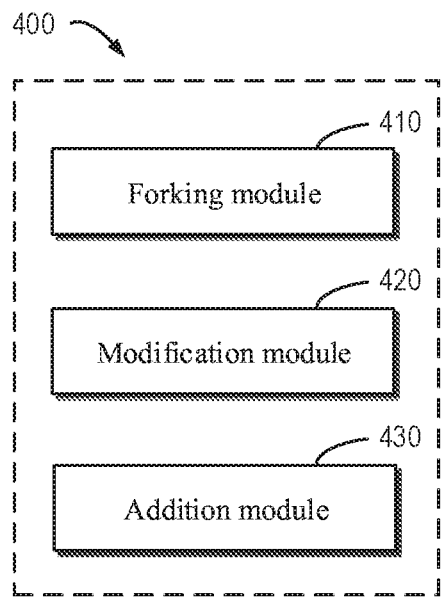
FIG. 4 shows a schematic block diagram of an apparatus for managing a knowledge base according to an embodiment of the present disclosure.

FIG. 4 shows a schematic block diagram of an apparatus 400 for managing a knowledge base according to an embodiment of the present disclosure. As shown in FIG. 4, the apparatus 400 includes: a forking module 410 configured to fork, in response to receiving a request for modification of a rule for a first namespace, the rule to the first namespace, the rule being used to constrain structured data in a knowledge base; a modification module 420 configured to modify, based on the request for modification of the rule, the rule in the first namespace; and an addition module 430 configured to add the modified rule to a rule base associated with the knowledge base.

In some embodiments, the forking module 410 includes: a rule forking module configured to fork the rule to the first namespace from at least one of the following: the rule base or a second namespace, the second namespace being different from the first namespace.

In some embodiments, the modification module 420 includes: a determination module configured to determine a rule modification mode for modifying the rule from the request for modification of the rule; and a rule modification module configured to modify, based on the rule modification mode, at least one of the following: one of a plurality of entities contained in the rule, or a relationship between the plurality of entities.

In some embodiments, the addition module 430 includes: a rule addition module configured to add, in response to receiving a request for adding the modified rule from the first namespace to the rule base, the modified rule to the rule base. In some embodiments, the rule addition module includes: a sending module configured to send the request for adding the modified rule to the rule base; and a verification addition module configured to add, in response to receiving a response of allowing adding the modified rule to the rule base, the modified rule to the rule base.

In some embodiments, the apparatus 400 further includes: a provision module configured to provide, in response to receiving a request for use of the modified rule by a third namespace 228, the modified rule to the third namespace, the third namespace being different from the first namespace.

In some embodiments, the apparatus 400 further includes at least one of the following: a visual output module configured to visually output the modified rule; or a user programming interface output module configured to output the modified rule through a user programming interface.

Figure 5:
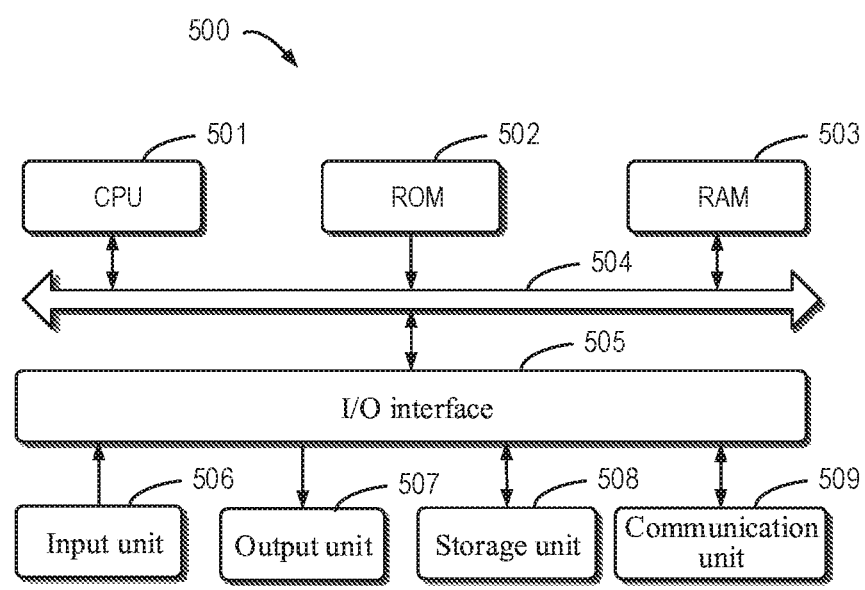
FIG. 5 shows a block diagram of a computing device capable of implementing some embodiments of the present disclosure.

FIG. 5 shows a schematic block diagram of an example device 500 that may be used to implement the embodiments of the present disclosure. The device 500 may be used to implement the computing device 110 of FIG. 1. As shown in FIG. 5, the device 500 includes a central processing unit (CPU) 501, which may execute various appropriate operations and processes based on computer program instructions stored in a read-only memory (ROM) 502 or computer program instructions loaded from a storage unit 508 to a random access memory (RAM) 503. The RAM 503 may also store various programs and data required by the operations of the device 500. The CPU 501, the ROM 502, and the RAM 503 are connected to each other through a bus 504. An input/output (I/O) interface 505 is also connected to the bus 504.

A plurality of components in the device 500 are connected to the I/O interface 505, including: an input unit 506, e.g., a keyboard, a mouse, etc.; an output unit 507, e.g., various types of displays, speakers, etc.; a storage unit 508, e.g., a magnetic disk, an optical disk, etc.; and a communication unit 509, e.g., a network card, a modem, a wireless communication transceiver, etc. The communication unit 509 allows the device 500 to exchange information/data with other devices over a computer network such as the Internet and/or various telecommunication networks.

The processing unit 501 executes the various methods and processes described above, such as the method 300. For example, in some embodiments, the method 300 may be implemented as a computer software program that is tangibly contained in a machine readable medium, such as the storage unit 508. In some embodiments, some or all of the computer program may be loaded and/or installed to the device 500 via the ROM 502 and/or the communication unit 509. When the computer program is loaded to the RAM 503 and executed by the CPU 501, one or more steps of the method 300 described above may be executed. Alternatively, in other embodiments, the CPU 501 may be configured to execute the method 300 by any other suitable means (e.g., by means of firmware).

The functions described above may be executed at least in part by one or more hardware logic components. For example, non-restrictively, exemplary types of hardware logic components that may be used include: a field programmable gate array (FPGA), an application specific integrated circuit (ASIC), an application specific standard product (ASSP), a system on chip (SOC), a complex programmable logic device (CPLD), etc.

Program codes for implementing the method of the present disclosure may be written in one programming language or any combination of more programming languages. The program codes may be provided to a processor or controller of a general purpose computer, a special purpose computer or other programmable data processing apparatus, so that the program codes, when executed by the processor or controller, cause the functions/operations specified in the flowcharts and/or block diagrams to be implemented. The program codes may be completely executed on a machine, partially executed on a machine, partially executed on a machine and partially executed on a remote machine as a separate software package, or completely executed on a remote machine or a server.

In the present disclosure, the machine readable medium may be a tangible medium that may contain or store programs used by a command execution system, apparatus or device or incorporated thereto. The machine readable medium may be a machine readable signal medium or a machine readable storage medium. The machine readable medium may include, but is not limited to, electric, magnetic, optical, electromagnetic, infrared, or semiconductor systems, apparatuses, devices, or a combination of any of the above. A more specific example of the machine readable storage medium may include an electrical connection based on one or more wires, a portable computer disk, a hard disk, a random access memory (RAM), a read-only memory (ROM), an erasable programmable read-only memory (EPROM or flash memory), a fiber, a portable compact disk read-only memory (CD-ROM), an optical memory, a magnet memory, or any suitable combination of the above.

In addition, although the operations are described in a specific order, this should be understood that such operations are executed in the specific order shown or in order, or that all illustrated operations should be executed to achieve the desired results. Multitasking and parallel processing may be advantageous in certain circumstances. Likewise, although some specific implementation details are contained in the above description, these should not be construed as limiting the scope of the present disclosure. Some features described in the separate embodiments may also be implemented in combination in a single embodiment. Conversely, the various features described in a single embodiment may be implemented alone or implemented in a plurality of embodiments in any suitable combination.

Although the subject has been described in language specific to structural features and/or methodological operations, it should be understood that the subject defined in the appended claims is not necessarily limited to the specific features or operations described above. Instead, the specific features and operations described above are merely in exemplary forms of implementing the claims.

What is claimed is:

1. A method for managing knowledge bases, comprising:
setting a plurality of namespaces associated with different users, wherein the plurality of namespaces comprises a first namespace configured to be used by a first user to modify a rule to constrain structured data in a first knowledge base, and a second namespace configured to be used by a second user to modify the rule to constrain structured data in a second knowledge base, wherein the rule comprises a representation norm used to constrain structured data;
forking, in response to receiving a request for modification of the rule for the first namespace, the rule to the first namespace from a rule base or from the second namespace different from the first namespace, the rule being used to constrain structured data in the knowledge bases comprising the first knowledge base and the second knowledge base;
modifying, based on the request for modification of the rule, the rule in the first namespace;
establishing the first knowledge base by using the modified rule in the first namespace;
adding the modified rule to the rule base associated with the knowledge bases;
retaining a dependency between the rule and the modified rule; and
recording an operation of adding the modified rule.

2. The method according to claim 1, wherein the modifying the rule comprises:
determining a rule modification mode for modifying the rule from the request for modification of the rule; and
modifying, based on the rule modification mode, at least one of following:
one of a plurality of entities contained in the rule, or
a relationship between the plurality of entities.

3. The method according to claim 1, wherein the adding the modified rule to the rule base associated with the knowledge bases comprises:
adding, in response to receiving a request for adding the modified rule from the first namespace to the rule base, the modified rule to the rule base.

4. The method according to claim 3, wherein the adding the modified rule to the rule base associated with the knowledge bases comprises:
sending the request for adding the modified rule to the rule base; and
adding, in response to receiving a response of allowing adding the modified rule to the rule base, the modified rule to the rule base.

5. The method according to claim 1, further comprising:
providing, in response to receiving a request for use of the modified rule by a third namespace, the modified rule to the third namespace, the third namespace being different from the first namespace.

6. The method according to claim 1, further comprising at least one of following:
visually outputting the modified rule; or outputting the modified rule through a user programming interface.

7. An apparatus for managing knowledge bases, comprising:
at least one processor; and
a memory storing instructions, wherein the instructions when executed by the at least one processor, cause the at least one processor to perform operations, the operations comprising:
setting a plurality of namespaces associated with different users, wherein the plurality of namespaces comprises a first namespace configured to be used by a first user to modify a rule to constrain structured data in a first knowledge base, and a second namespace configured to be used by a second user to modify the rule to constrain structured data in a second knowledge base, wherein the rule comprises a representation norm used to constrain structured data;
forking, in response to receiving a request for modification of the rule for the first namespace, the rule to the first namespace from a rule base or from the second namespace different from the first namespace, the rule being used to constrain structured data in the knowledge bases comprising the first knowledge base and the second knowledge base;
modifying, based on the request for modification of the rule, the rule in the first namespace;
establishing the first knowledge base by using the modified rule in the first namespace;
adding the modified rule to the rule base associated with the knowledge bases;
retaining a dependency between the rule and the modified rule; and
recording an operation of adding the modified rule.

8. The apparatus according to claim 7, wherein the modifying the rule comprises:
determining a rule modification mode for modifying the rule from the request for modification of the rule; and
modifying, based on the rule modification mode, at least one of following:
one of a plurality of entities contained in the rule, or
a relationship between the plurality of entities.

9. The apparatus according to claim 7, wherein the adding the modified rule to the rule base associated with the knowledge bases comprises:
adding, in response to receiving a request for adding the modified rule from the first namespace to the rule base, the modified rule to the rule base.

10. The apparatus according to claim 9, wherein the adding the modified rule to the rule base associated with the knowledge bases comprises:
sending the request for adding the modified rule to the rule base; and
adding, in response to receiving a response of allowing adding the modified rule to the rule base, the modified rule to the rule base.

11. The apparatus according to claim 7, wherein the operations further comprise:
providing, in response to receiving a request for use of the modified rule by a third namespace, the modified rule to the third namespace, the third namespace being different from the first namespace.

12. The apparatus according to claim 7, wherein the operations further comprise at least one of following:
visually outputting the modified rule; or
outputting the modified rule through a user programming interface.

13. A non-transitory computer readable storage medium storing a computer program, wherein the computer program, when executed by a processor, causes the processor to perform operations, the operations comprising:
setting a plurality of namespaces associated with different users, wherein the plurality of namespaces comprises a first namespace configured to be used by a first user to modify a rule to constrain structured data in a first knowledge base, and a second namespace configured to be used by a second user to modify the rule to constrain structured data in a second knowledge base, wherein the rule comprises a representation norm used to constrain structured data;
forking, in response to receiving a request for modification of the rule for the first namespace, the rule to the first namespace from a rule base or from the second namespace different from the first namespace, the rule being used to constrain structured data in knowledge bases comprising the first knowledge base and the second knowledge base;
modifying, based on the request for modification of the rule, the rule in the first namespace;
establishing the first knowledge base by using the modified rule in the first namespace;
adding the modified rule to the rule base associated with the knowledge bases;
retaining a dependency between the rule and the modified rule; and
recording an operation of adding the modified rule.

14. The non-transitory computer readable storage medium according to claim 13, wherein the modifying the rule comprises:
determining a rule modification mode for modifying the rule from the request for modification of the rule; and
modifying, based on the rule modification mode, at least one of following:
one of a plurality of entities contained in the rule, or
a relationship between the plurality of entities.

15. The non-transitory computer readable storage medium according to claim 13, wherein the adding the modified rule to the rule base associated with the knowledge bases comprises:
adding, in response to receiving a request for adding the modified rule from the first namespace to the rule base, the modified rule to the rule base.

16. The non-transitory computer readable storage medium according to claim 15, wherein the adding the modified rule to the rule base associated with the knowledge bases comprises:
sending the request for adding the modified rule to the rule base; and
adding, in response to receiving a response of allowing adding the modified rule to the rule base, the modified rule to the rule base.

17. The non-transitory computer readable storage medium according to claim 13, wherein the operations further comprise:
providing, in response to receiving a request for use of the modified rule by a third namespace, the modified rule to the third namespace, the third namespace being different from the first namespace.

* * * * *